United States Patent
Harasawa et al.

(10) Patent No.: US 6,875,495 B2
(45) Date of Patent: Apr. 5, 2005

(54) MAGNETIC RECORDING MEDIUM

(75) Inventors: Takeshi Harasawa, Kanagawa (JP); Noriko Ioue, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/447,964

(22) Filed: May 30, 2003

(65) Prior Publication Data
US 2003/0224210 A1 Dec. 4, 2003

(30) Foreign Application Priority Data
May 31, 2002 (JP) .................................... P.2002-159619

(51) Int. Cl.⁷ ................................................ G11B 5/66
(52) U.S. Cl. ..................... 428/141; 428/323; 428/403; 428/694 BB
(58) Field of Search ................................ 428/141, 323, 428/403, 694 BB

(56) References Cited

U.S. PATENT DOCUMENTS

| | | | | |
|---|---|---|---|---|
| 4,678,706 A | * | 7/1987 | Tokunaga et al. | 428/323 |
| 6,287,668 B1 | * | 9/2001 | Hayashi et al. | 428/141 |
| 2001/0044036 A1 | * | 11/2001 | Hayashi et al. | 428/694 BB |

FOREIGN PATENT DOCUMENTS

| | | | |
|---|---|---|---|
| JP | 61-131221 | * | 6/1986 |
| JP | 10-302243 A | | 11/1998 |
| JP | 11-259851 A | | 9/1999 |

* cited by examiner

Primary Examiner—Stevan A. Resan
(74) Attorney, Agent, or Firm—Sughrue Mion, PLLC

(57) ABSTRACT

A magnetic recording medium comprising a magnetic layer, a support and a backing layer in this order, wherein the backing layer comprises a binder and an inorganic powder having a surface covered with an electrically conductive substance.

25 Claims, No Drawings

MAGNETIC RECORDING MEDIUM

FIELD OF THE INVENTION

The present invention relates to a magnetic recording medium capable of high density recording excellent in running durability and electromagnetic characteristics.

BACKGROUND OF THE INVENTION

In the field of magnetic tape, with the prevalence of the office computer, such as minicomputers, personal computers and work stations, magnetic tapes for recording computer data as external storage media (a so-called backup tape) have been eagerly studied. In putting magnetic tapes for such uses to practical use, the improvement of recording capacity has been strongly demanded conjointly with the miniaturization of a computer and the increase of throughput for achieving high capacity recording and the miniaturization.

Magnetic recording media comprising a support having coated thereon a magnetic layer comprising an iron oxide, a Co-modified iron oxide, $CrO_2$, ferromagnetic metal powder, or hexagonal ferrite powder dispersed in a binder have been conventionally widely used. Of these powders, ferromagnetic alloy powders of fine particles and hexagonal ferrite fine powders are known to be excellent in high density recording characteristics. However, when inductive heads which have been mainly used in the system using flexible media are used, these ferromagnetic powders are small in saturation magnetization, hence sufficient output cannot be obtained. However, a magneto-resistance head (an MR head) which is used in a hard disc has also come to be used in removable recording using flexible media as above.

Since an MR head is high sensitivity and capable of obtaining sufficient reproduction output, when magnetic fine particles having relatively low saturation magnetization as is used, a high C/N ratio can be obtained by the reduction of noise. For instance, an example of the reproduction with an MR head by using a barium ferrite (BaFe) fine particles is disclosed in JP-A-10-302243 (the term "JP-A" as used herein means an "unexamined published Japanese patent application").

In a recording system of high recording density (in particular, track recording density), it is necessary to optimize the relationship between recording conditions and the medium, besides an MR head is used at reproduction. In high track recording density, the gap of recording heads is generally made small for reducing the influences such as recording demagnetization and bit shift at recording, by which, however, recording magnetic field narrows and overwriting and thickness loss are traded off. Further, since the width of magnetic flux revolution narrows, the influence of turbulence of magnetization in a magnetization transition region cannot be negligible, which results in the loss of S/N ratio.

Further, it is discussed to obtain a high C/N ratio by using ferromagnetic metal powders, but the noise near the carrier increases when ferromagnetic metal powders are used as compared with the time when a metal evaporation tape (hereinafter referred to as an ME tape) is used, and so the reduction of the noise near the carrier is desired.

Further, the reliability of the time when data are repeatedly used and saved is also required of a magnetic recording medium. Accordingly, a magnetic recording medium is demanded to have good running durability in addition to excellent electromagnetic characteristics. For that sake, particularly in tape media, the improvement of running durability is contrived by providing a backing layer. To improve running durability by a backing layer, providing protrusions on the support surface, or roughening the surface of a backing layer by adding coarse particle carbon having a particle size of 0.1 µm or more has been tried. However, if the surface of a backing layer is roughened by these methods, when a magnetic recording tape is wound onto a hub for preservation or processing, the backing layer and the magnetic layer are tightly pressed and the protrusions of the backing layer are impressed on the magnetic layer, i.e., so-called "setoff", is caused. As a result, a drawback such that electromagnetic characteristics are deteriorated arises. For solving such "setoff", it is tried to smooth the backing layer surface.

As an example of the trial of smoothing a backing layer for improving the setoff to thereby increase electromagnetic characteristics, an example of using a mixture of granular titanium oxide and carbon black as a main ingredient is disclosed in JP-A-11-259851.

However, as described above, further reduction of the noise near the carrier and the security of running durability are desired.

SUMMARY OF THE INVENTION

An object of the present invention is to provide a magnetic recording medium which is capable of inhibiting the setoff of a backing layer to a magnetic layer, excellent in electromagnetic characteristics even when fine particle magnetic powder is used, and, at the same time, capable of obtaining good running stability and durability in high density recording.

The above object of the present invention can be achieved by a magnetic recording medium comprising a support having a magnetic layer on one surface and a backing layer on the opposite side of the support, wherein the backing layer contains inorganic powder whose particle surfaces are covered with an electrically conductive substance, and a binder.

The preferred embodiments of the present invention are as follows.
The central plane average surface roughness Ra of the backing layer is from 2 to 4 nm.
The inorganic powder whose particle surfaces are covered with an electrically conductive substance (hereinafter also referred to as electrically conductive substance-covered inorganic powder) accounts for 50 mass % (weight %) or more of the entire powder contained in the backing layer, and the backing layer contains carbon black in an amount of 50 mass % or less based on the electrically conductive substance-covered inorganic powder.
The inorganic powder covered with an electrically conductive substance is an acicular oxide.

DETAILED DESCRIPTION OF THE INVENTION

The present invention is characterized in that electrically conductive substance-covered inorganic powder is used in a backing layer. The electrically conductive substance-covered inorganic powder is an inorganic powder whose particle surfaces are covered with an electrically conductive substance. "Covering" in the present invention means that an electrically conductive substance may be physically adsorbed onto the surfaces of an inorganic powder, or an electrically conductive substance may be bonded to the surfaces of an inorganic powder by covalent bonding, and in each case, it is preferred that the state of covering is retained in the backing layer of a magnetic recording medium. The retention is preferably 50 mass % or more of the electrically conductive substance, and more preferably 80 mass % or more.

It is preferred that the particles of an inorganic powder be subjected to pretreatment before being covered with an electrically conductive substance. The pretreatment is not particularly restricted and conventionally well-known methods can be used. As the preferred pretreatment, covering by resins, e.g., silicone resins, acrylic resins and epoxy resins, is exemplified. These resins are preferably used in an amount of from 1 to 40 mass % of the inorganic powder, and more preferably from 10 to 20 mass %.

As the electrically conductive substance, carbon, metals, and semiconductors, e.g., $In_2O_3$, are exemplified, and carbon is preferred, and carbon black is more preferred. The amount of the electrically conductive substance is preferably from 0.1 to 10 mass % of the inorganic powder, and more preferably from 1 to 5 mass %.

The inorganic substance is not particularly limited but an oxide is preferably used, and an acicular oxide is preferred above all.

By using electrically conductive substance-covered inorganic powder in a backing layer, the surface electrical resistance Rs of the backing layer surface (also referred to as the back surface) can be effectively reduced, in particular, electromagnetic characteristics can be improved by using electrically conductive substance-covered acicular inorganic powder.

The magnetic recording medium of the present invention widely includes those comprising a support having a magnetic layer on one surface and a backing layer on the opposite side of the support. Accordingly, magnetic recording media having layers other than a magnetic layer and a backing layer are also included in the magnetic recording medium of the present invention. For example, the magnetic recording medium of the invention may have a nonmagnetic layer containing nonmagnetic powder, a soft magnetic layer containing soft magnetic powder, a second magnetic layer, a cushioning layer, an overcoat layer, an adhesive layer and a protective layer. These layers can be provided at appropriate places so that their functions can be effectively exhibited. A magnetic layer can have a layer thickness of, for example, generally from 0.01 to 1 $\mu$m, preferably from 0.03 to 0.5 $\mu$m, and more preferably from 0.03 to 0.2 $\mu$m, and a nonmagnetic layer can have a layer thickness of generally from 0.5 to 3 $\mu$m, and preferably from 0.8 to 3 $\mu$m. The layer thickness of a nonmagnetic layer is preferably thicker than the thickness of a magnetic layer. A magnetic recording medium having two magnetic layers is also preferably used in the present invention. In this case, e.g., the upper layer thickness may be, e.g., generally from 0.2 to 2 $\mu$m, preferably from 0.2 to 1.5 $\mu$m, and the lower layer thickness maybe generally from 0.8 to 3 $\mu$m. When a magnetic layer comprises a single layer, the layer thickness of the magnetic layer is generally from 0.1 to 5 $\mu$m, preferably from 0.1 to 3 $\mu$m, and more preferably from 0.1 to 1.5 $\mu$m. When a soft magnetic layer is provided between a support and a magnetic layer, the magnetic layer thickness may be, e.g., generally from 0.03 to 1 $\mu$m, preferably from 0.05 to 0.5 $\mu$m, and the soft magnetic layer thickness maybe generally from 0.8 to 3 $\mu$m. With respect to the magnetic layer of the present invention, not only a so-called coating type magnetic layer containing ferromagnetic powder dispersed in a binder but a thin film type magnetic layer formed by vacuum evaporation or sputtering may be used. The thin film type magnetic layer has a layer thickness of generally from 0.05 to 0.3 $\mu$m, and more preferably from 0.1 to 0.2 $\mu$m. The thickness of a backing layer formed in the magnetic recording medium of the invention is generally from 0.05 to 1.0 $\mu$m, preferably from 0.1 to 0.8 $\mu$m, and more preferably from 0.2 to 0.6 $\mu$m.

A backing layer in the magnetic recording medium of the invention contains electrically conductive substance-covered inorganic powder. As the inorganic powder, metals, metal salts and metallic oxides are exemplified. As the inorganic powder, metallic oxides, e.g., titanium oxide, alpha-iron oxide, goethite, $SiO_2$, $SnO_2$, $WO_2$, $Al_2O_3$, $ZrO_2$ and ZnO, salts, e.g., barium titanate, and metallic whiskers of, e.g., Cu and Al can be used.

Oxides which are excellent in chemical stabilization are preferably used as inorganic powders. They can be used as mixture.

The figures of electrically conductive substance-covered inorganic powders are arbitrary, and generally similar figures to those of the inorganic powders are used, but the present invention is not limited thereto. When the electrically conductive substance-covered inorganic powder is spherical, the particle size of the inorganic powder is generally from 0.05 to 0.1 $\mu$m, and preferably from 0.1 to 0.4 $\mu$m. When the electrically conductive substance-covered inorganic powder is acicular, the acicular ratio of the inorganic powder is preferably from 2 to 10, and more preferably from 4 to 8. The long axis length is preferably from 0.01 to 0.02 $\mu$m, and more preferably from 0.06 to 0.15 $\mu$m. The acicular ratio in the invention is a value obtained by dividing the long axis length of the particle by the short axis length. The short axis length means the maximum length of the cross-section obtained by cutting the long axis length perpendicularly.

The figures of electrically conductive substance-covered inorganic powder and the material inorganic powder is preferably acicular figure having the above acicular ratio. When the acicular ratio is too small, the voids of the coated film reduce and the film-forming effect by calendering is impaired. When the acicular ratio is too great, surface roughness increases and resistance to the setoff deteriorates.

As inorganic powders which are the materials of electrically conductive substance-covered inorganic powders and subjected to pretreatment by the above resins, inorganic powders at least a part of the surfaces of which is covered with at least one compound selected from $Al_2O_3$, $SiO_2$, $TiO_2$, $ZrO_2$, $SnO_2$, $Sb_2O_3$ and $ZnO_2$ are preferred, and inorganic powders covered with at least one compound selected from $Al_2O_3$, $SiO_2$ and $ZrO_2$ are especially preferred in the point of excellent covering property of the resins. Such powders can be obtained by synthesizing the particles of inorganic powders and then by treatment such as depositing or coating other compounds as above on the surfaces of the particles, or by coprecipitating inorganic powders and at least one compound selected from $Al_2O_3$, $SiO_2$, $TiO_2$, $ZrO_2$, $SnO_2$, $Sb_2O_3$ and $ZnO_2$.

These inorganic powders are also commercially available. For example, DPN-245, DPN-250, DPN-250BX, DPN-270BX, DPN-550BX, DPN-550RX, TF-100 and TF-120 (manufactured by Toda Kogyo Co., Ltd.), TTO-51A, TTO-51B, TTO-51C, TTO-53B, TTO-55A, TTO-55B, TTO-55C, TTO-55D, TTO-55N, TTO-55S, TTO-S-1, TTO-S-2, TTO-M-1, TTO-M-2, TTO-D-1, TTO-D-2, SN-100, E270 and E271 (manufactured by Ishihara Sangyo Kaisha Ltd.), STT-4D, STT-30D, STT-30 and STT-65C (manufactured by Titan Kogyo Co., Ltd.), MT-10° F., MT-10OS, MT-100T, MT-150W, MT-500B, MT-500HD and MT-600B (manufactured by Teika Co., Ltd.), $TiO_2P_{25}$ (manufactured by Nippon Aerosil Co., Ltd.), and Super Titania (manufactured by Showa Denko Co., Ltd.) are exemplified.

It is preferred to use two or more kinds of carbon blacks in a backing layer for adjusting the surface property of a backing layer and adjusting the surface electrical resistance. Carbon blacks generally used in magnetic recording media can be widely used in a backing layer. For example, furnace blacks for rubbers, thermal blacks for rubbers, carbon blacks for coloring, and acetylene blacks can be used. The particle size of carbon blacks is preferably 100 nm or less for preventing the protrusions of a backing layer from being impressed on a magnetic layer, and particularly preferably from 15 to 80 nm. Carbon blacks for use in a backing layer have pH of generally from 2 to 10, a water content of from 0.1 to 10%, a tap density of from 0.1 to 1 g/ml, a specific surface area of generally from 100 to 500 $m^2/g$, preferably from 150 to 400 $m^2/g$, and a DBP oil absorption of generally from 20 to 400 ml/100 g, preferably from 30 to 200 ml/100 g. The specific examples of carbon blacks for use in a backing layer in the present invention include BLACK PEARL S2000, S1300, S1000, S900, S800, S880 and S700, and VULCAN XC-72 (manufactured by Cabot Co., Ltd.), #3050B, #3150B, #3250B, #3750B, #3950B, #950, #650B, #970B and #850B, and MA-600 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), Ketjen Black EC (manufactured by Akzo Co., Ltd.), #55, #50 and #30 (manufactured by Asahi Carbon Co., Ltd.), RAVEN 450 and 430 (manufactured by Columbia Carbon Co., Ltd.), and THERMAX MT (manufactured by Cancarb Co., Ltd.). These carbon blacks can also be used as the electrically conductive substances of the electrically conductive substance-covered inorganic powder.

Carbon blacks are contained in a backing layer in an amount of preferably 50 mass % or less, and more preferably from 20 to 40 mass %, based on the electrically conductive substance-covered inorganic powder.

By adding electrically conductive substance-covered inorganic powder in a greater amount than the amount of carbon black in this manner, a backing layer having good dispersibility of the inorganic powder and smooth surface can be formed, and so the central plane average surface roughness, Ra of the backing layer can be made preferably from 2 to 4 nm, and more preferably from 2.5 to 3.5 nm.

It is preferred to make the height of protrusions of the back surface 30 nm or less for the purpose of reducing the setoff. The mixing ratios, kinds and sizes of the electrically conductive substance-covered inorganic powder and carbon black are selected so that protrusions having heights of from 30 to 100 nm are formed on the smooth back surface in number of preferably from 10 to 1,500/90 $\mu m$ square. It is preferred to form these protrusions mainly by carbon black and electrically conductive substance-covered inorganic powder. The height and density of protrusions are the values measured by a Nanoscope III (an interatomic force microscope, a product of Digital Instruments, U.S.A.). Three dimensional surface roughness is measured by Nanoscope III, and the number of protrusions having the above height can be obtained from the average surface of the surface roughness of a magnetic layer. The average surface here is the surface where the volumes of concavities and convexities in the measured area are equal. The measurement is performed in the area of 90 $\mu m \times 90$ $\mu m$ by a contact mode and a scanning velocity of 2 Hz.

A backing layer-forming coating solution having such a composition has a high thixotropic property as compared with conventional backing layer-forming coating solutions comprising carbon black as a main ingredient. Therefore, it is possible to perform coating of extrusion coating and gravure coating with a coating solution of high concentration. A backing layer having high adhesive force with a support and high dynamic strength can be formed by coating a coating solution of such high concentration, notwithstanding the film thickness is thin. By using a backing layer-forming coating solution having high concentration, even when a subbing layer mainly comprising low molecular weight polyester is formed between a backing layer and a support, the low molecular weight polyester can be prevented from bleeding to the backing layer surface. Therefore, the adhesion failure and running failure due to bleeding of a subbing layer, which have so far been problems when a subbing layer is formed, can be effectively avoided. Accordingly, it becomes easy to adjust the adhesion strength between a backing layer and a support to a desired range by forming an adhesive subbing layer. However, a subbing layer does not necessarily have to be formed. The adhesion strength between a backing layer and a support can be improved by using a vinyl chloride resin or a urethane resin as the binder for a backing layer-forming coating solution to thereby adjust the ratio of the carbon black, or by using cyclohexanone as the main solvent to thereby reduce the surface energy difference between a backing layer and a support. The adhesion strength between a support and a backing layer in the invention can be adjusted to a desired range by arbitrarily selecting and combining these means.

The use amount of a binder in a backing layer is preferably from 10 to 50 mass parts with the total mass of the powder contained in a backing layer being 100 mass parts, and more preferably from 20 to 40 mass parts. The thus-formed backing layer has high film strength and low surface electrical resistance. Due to the backing layer having such excellent functions, the magnetic recording medium in the present invention is excellent in running durability and electromagnetic characteristics as compared with conventional products.

As the binder for a backing layer of the present invention, well-known thermoplastic resins, thermo-setting resins and reactive type resins can be used. The examples of preferred binders include a vinyl chloride resin, a vinyl chloride-vinyl acetate resin, cellulose resins, e.g., a nitrocellulose, a phenoxy resin and a polyurethane resin. Of these resins, a vinyl chloride resin, a vinyl chloride-vinyl acetate resin, and a polyurethane resin are more preferably used, since the hardness of a backing layer approaches the hardness of a magnetic layer, as a result, the setoff can be reduced.

The polyurethane resin preferably contains at least one polar group selected from the following groups in the molecule, e.g., $-SO_3M$, $-OSO_3M$, $-COOM$, $-PO_3MM'$, $-OPO_3MM'$, $-NRR'$ and $-N^+RR'R''COO^-$ (wherein M and M' each represents a hydrogen atom, an alkaline metal, an alkaline earth metal or ammonium, R and R' each represents an alkyl group having from 1 to 12 carbon atoms, and R" represents an N-bonded alkylene group having from 1 to 12 carbon atoms), and $-SO_3M$ and $-OSO_3M$ are particularly preferred. The addition amount of these polar groups is preferably from $1 \times 10^5$ to $2 \times 10^{-4}$ eq/g, and particularly preferably from $5 \times 10^{-5}$ to $1 \times 10^{-4}$ eq/g. When the amount is less than $1 \times 10^{-5}$ eq/g, the adsorption onto inorganic powder becomes insufficient, thus dispersibility is liable to lower, and when the amount is more than $2 \times 10^{-4}$ eq/g, the solubility in a solvent lowers, thus dispersibility is liable to lower.

The number average molecular weight (Mn) of polyurethane resins is preferably from 5,000 to 100,000, more preferably from 10,000 to 50,000, and particularly preferably from 2,000 to 40,000. When the number average molecular weight of polyurethane resins is less than 5,000, the strength of the film and durability are low. When it is more than 100,000, the solubility and dispersibility in a solvent are low. The cyclic structure of polyurethane resins contributes to stiffness and the ether group contributes to flexibility.

It is preferred that a backing layer of the magnetic recording medium of the invention contains a lubricant as the ingredient other than electrically conductive substance-covered inorganic powder, carbon black and a binder. As the lubricant, fatty acid, fatty acid ester, and fatty acid amide are exemplified. In particular, it is indispensable to contain fatty acid for inhibiting the rising of friction coefficient in repeating running while maintaining the strength. By using fatty acid ester, fatty acid amide or an abrasive having a Moh's hardness of 8 or more, the rising of friction coefficient in repeating running can be inhibited and sliding durability can be improved. The rising of friction coefficient can also be inhibited with an aromatic organic compound and a titanium coupling agent, to thereby improve dispersibility and heighten the strength. Further, the rising of friction coefficient can be inhibited with organic powder, to thereby reduce the setoff. The examples of fatty acids which can be used include a monobasic fatty acid having from 8 to 24 carbon atoms, a monobasic fatty acid having from 8 to 18 carbon atoms is preferred above all. The specific examples of these fatty acids include a lauric acid, a caprylic acid, a myristic acid, a palmitic acid, a stearic acid, a behenic acid, an oleic acid, a linoleic acid, a linolenic acid and an elaidic acid. Amides of these fatty acids can also be used.

The examples of fatty acid esters include mono-fatty acid esters, di-fatty acid esters or tri-fatty acid esters comprising a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched). The specific examples of these fatty acid esters include butyl stearate, octyl stearate, amyl stearate, isooctyl stearate, octyl myristate, butoxyethyl stearate, anhydrosorbitan monostearate, anhydrosorbitan distearate and anhydrosorbitan tristearate.

The addition amount of lubricants to a backing layer is preferably from 0.1 to 5 mass parts, and more preferably from 0.5 to 3 mass parts, based on 100 mass parts of the electrically conductive substance-covered inorganic powder.

As the abrasives having a Moh's hardness of 8 or more, alpha-alumina, chromium oxide, artificial diamond, and carbon-modified boron nitride (CBN) can be exemplified. Above all, it is preferred to use abrasives having an average particle size of 0.2 $\mu$m or less and particle sizes which are less than the thickness of a backing layer. Since a backing layer can be thinned in the present invention, sufficient sliding durability can be secured by the addition of even a small amount of abrasive. As the aromatic organic acid compound, a phenylphosphonic acid is preferably used. The addition amount of the aromatic organic acid compound is preferably from 1 to 10 mass parts, and more preferably from 3 to 6 mass parts, based on 100 mass parts of the electrically conductive substance-covered inorganic powder.

As the organic powder, acrylic-styrene copolymer resin powders, benzoguanamine resin powders, melamine resin powders, and phthalocyanine pigments can be used.

The glass transition temperature of a backing layer is preferably from 60 to 120° C., and the dry thickness of a backing layer is generally from 0.05 to 1.0 $\mu$m or so.

Since the protrusions of a backing layer are hardly impressed on a magnetic layer in the magnetic recording medium of the invention even when the medium is wound with high tension and stored, the tape thickness can be made from 4 to 9 $\mu$m.

The ferromagnetic powders which are used in a magnetic layer in the present invention are preferably acicular ferromagnetic alloy powders containing Fe as a main component, e.g., Fe or Fe—Co, or hexagonal ferrite powders. The hexagonal ferrite powders include substitution products, e.g., barium ferrite, strontium ferrite, lead ferrite and calcium ferrite, and Co substitution products. Specifically, magnetoplumbite type barium ferrite and strontium ferrite, magnetoplumbite type ferrite having covered the particle surfaces with spinel, magnetoplumbite type barium ferrite and strontium ferrite partially containing spinel phase are exemplified. The hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, hexagonal ferrite powders containing the following elements can be used, e.g., Co—Zn, Co—Ti, Co—Ti—Zr, Co—Ti—Zn, Ni—Ti—Zn, Nb—Zn—Co, Sb—Zn—Co or Nb—Zn. According to starting materials and producing methods, specific impurities may be contained.

The particle sizes of both alloys powders and hexagonal ferrite powders are generally from 1,000 to 10,000 nm$^3$, preferably from 1,500 to 8,500 nm$^3$, and more preferably from 1,500 to 6,500 nm$^3$, as the average volume of primary particles. In the case of acicular alloy powders, the average long axis length is generally from 30 to 100 nm, and preferably from 40 to 80 nm, and the crystallite size is generally from 5 to 15 nm, and preferably from 8 to 13 nm. In the case of hexagonal ferrite powders, the average tabular diameter is generally from 10 to 50 nm, preferably from 10 to 40 nm, and particularly preferably from 15 to 35 nm. In particular, when MR heads are used in reproduction for the purpose of increasing track density, it is necessary to reduce noise, accordingly the tabular diameter is preferably 35 nm or less, but if it is smaller than 10 nm, stable magnetization cannot be obtained due to thermal fluctuation. When the tabular diameter is more than 50 nm, noise increases, and such tabular diameters are not suitable for high density magnetic recording of the present invention. The average tabular ratio [arithmetic mean of (tabular diameter/tabular thickness)] of these powders is preferably from 1 to 15, and more preferably from 1 to 7. When the average tabular ratio is small, the packing density in a magnetic layer becomes high, which is preferred but satisfactory orientation cannot be obtained. When it is higher than 15, noise increases due to stacking among particles. The specific surface area ($S_{BET}$) measured by the BET method of the particle sizes having diameters within this range is from 10 to 100 m$^2$/g. The specific surface area nearly coincides with the value obtained by the arithmetic operation from the tabular diameter and the tabular thickness of a particle. The distribution of the tabular diameter/tabular thickness of particles is in general preferably as narrow as possible. It is difficult to express the distribution of tabular diameter/tabular thickness of particles in a numerical value but the distribution can be compared by measuring 500 particles randomly from TEM photographs. The distributions are not regular distributions in many cases, but σ/average size expressed by the standard deviation to the average size by computation is generally from 0.1 to 2.0. For obtaining narrow particle size distribution, it is effective to make a particle-forming reaction system homogeneous as far as possible, to subject particles formed to distribution-improving treatments as well. For example, a method of selectively dissolving ultrafine particles in an acid solution is also known.

Coercive force (Hc) measured in ferromagnetic powders of generally from about 40 to about 400 kA/m can be produced. Higher Hc is advantageous for high density recording but it is restricted by the capacity of a recording head. Ferromagnetic powders preferably have Hc of from about 119 to about 397 kA/m, and more preferably from 159 to 320 kA/m. When the saturation magnetization of ahead is higher than 1.4 tesla, Hc is preferably 175 kA/m or more. Hc can be controlled by particle sizes, the kinds and amounts of elements contained, the substitution sites of elements, and the reaction conditions of particle formation. Saturation magnetization (as) is from 90 to 150 A·m$^2$/kg in the case of ferromagnetic alloy powders, and from 40 to 80 A·m$^2$/kg in the case of hexagonal ferrite powders.

Saturation magnetization has inclination of becoming smaller as particles become finer. For improving saturation magnetization, it is well known to use composite of magnetoplumbite ferrite with spinel ferrite, to select the kinds and amounts of elements to be contained. W-type hexagonal ferrite can also be used. When magnetic powders are dispersed, the particle surfaces of the magnetic powders may be treated with substances compatible with the dispersion media and the polymers. Inorganic or organic compounds are used as the surface treating materials. Oxides or hydroxides of Si, Al, P and the like, various kinds of silane coupling agents, and various kinds of titanium coupling agents are representative examples of the main compounds. The amount of these surface treating materials is from 0.1 to 10% based on the amount of the magnetic powder. The pH of magnetic powders is also important for dispersion. pH is generally from 4 to 12 or so, and the optimal value is dependent upon the dispersion medium and the polymer. Taking the chemical stability and the storage stability of magnetic media into consideration, pH of from about 6 to about 11 is selected. The water content in the magnetic powder also influences dispersion. The optimal value is dependent upon the dispersion medium and the polymer, and the water content is generally from 0.01 to 2.0%. The producing methods of hexagonal ferrite include the following methods and any of these methods can be used in the present invention, i.e., a glass crystallization method comprising the steps of mixing metallic oxides which substitute barium oxide, iron oxide and iron, with boron oxide and the like as a glass-forming material so as to make a desired ferrite composition, melting and then quenching the mixture to obtain an amorphous product, subjecting the amorphous product obtained to reheating, washing and then pulverizing, to thereby obtain barium ferrite crystal powder; a hydrothermal reaction method comprising the steps of neutralizing a solution of barium ferrite composition metal salts with an alkali, removing the byproducts produced, heating the liquid phase at 100° C. or more, washing, drying and then pulverizing, to thereby obtain barium ferrite crystal powder; and a coprecipitation method comprising the steps of neutralizing a solution of barium ferrite composition metal salts with an alkali, removing the byproducts produced and drying, treating the system at 1,100° C. or less, and then pulverizing, to thereby obtain barium ferrite crystal powder.

In the present invention, a magnetic layer-forming coating solution is produced by kneading and dispersing a binder, a hardening agent and ferromagnetic powder with a solvent generally used in preparing a magnetic layer coating solution, e.g., methyl ethyl ketone, dioxane, cyclohexanone or ethyl acetate. Kneading and dispersion can be performed according to ordinary methods. In addition to the above ingredients, a magnetic layer-forming coating solution may contain generally-used additives and fillers, such as abrasives, e.g., alpha-$Al_2O_3$ and $Cr_2O_3$, antistatic agents, e.g., carbon black, lubricants, e.g., fatty acid, fatty acid ester and silicone oil, and dispersants.

In the next-place, a lower nonmagnetic layer or a lower magnetic layer (hereinafter a lower nonmagnetic layer or a lower magnetic layer is also referred to as a lower layer) present in the case where the magnetic recording medium of the invention has multilayer constitution is described below. The inorganic powders used in a lower layer may be magnetic powder or nonmagnetic powder. For example, the nonmagnetic powder can be selected from inorganic compounds, e.g., metallic oxide, metallic carbonate, metallic sulfate, metallic nitride, metallic carbide and metallic sulfide, and nonmagnetic metals. The examples of the inorganic compounds are selected from the following compounds and they can be used alone or in combination, e.g., titanium oxides ($TiO_2$, TiO), alpha-alumina having an alpha-conversion rate of from 90% to 100%, beta-alumina, gamma-alumina, alpha-iron oxide, chromium oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfide, goethite and aluminum hydroxide. Of these compounds, titanium dioxide, zinc oxide, iron oxide and barium sulfate are particularly preferred, and titanium dioxides disclosed in JP-A-5-182177, and alpha-iron oxides disclosed JP-A-6-60362 and JP-A-9-170003 are more preferred. As the nonmagnetic metals, Cu, Ti, Zn and Al can be exemplified. These nonmagnetic powders preferably have an average particle size of from 0.005 to 2 µm. A plurality of nonmagnetic powders each having a different particle size may be combined, if necessary, or a single nonmagnetic powder having a broad particle size distribution may be used so as to obtain the same effect as such a combination. Particularly preferred nonmagnetic powders are those having an average particle size of from 0.01 to 0.2 µm. Nonmagnetic powders have a pH value of preferably from 6 to 9, a specific surface area ($S_{BET}$) of from 1 to 100 m$^2$/g, preferably from 5 to 50 m$^2$/g, and more preferably from 7 to 40 m$^2$/g, a crystallite size of from 0.01 to 2 µm, an oil absorption amount using DBP of from 5 to 100 ml/100 g, preferably from 10 to 80 ml/100 g, and more preferably from 20 to 60 ml/100 g, and a specific gravity of from 1 to 12, and preferably from 3 to 6. The figure of nonmagnetic powders may be any of acicular, spherical, polyhedral and tabular figures.

As the soft magnetic powders, particulate Fe, Ni, particulate magnetite, Fe—Si, Fe—Al, Fe—Ni, Fe—Co, Fe—Co—Ni, Fe—Al—Co (Sendust) alloys, Mn—Zn ferrite, Ni—Zn ferrite, Mg—Zn ferrite, Mg—Mn ferrite, and other soft magnetic powders described in Fusanobu Chikazumi, *Kyojiseitai no Butsuri* (*Ge*) (*Physics of Ferromagnetic Substances* (*the last volume*)), "Jiki Tokusei to Oyo (Magnetic Characteristics and Applications)", pp. 368 to 376, Shokabo Co. (1984) are exemplified. It is preferred that at least a part of the surfaces of these nonmagnetic powders and soft magnetic powders are covered with any of $Al_2O_3$, $SiO_2$, $TiO_2$, $ZrO_2$, $SnO_2$, $Sb_2O_3$ and $ZnO_2$, of these compounds, $Al_2O_3$, $SiO_2$, $TiO_2$ and $ZrO_2$ are especially preferred in the point of capable of exhibiting good dispersibility, and $Al_2O_3$, $SiO_2$ and $ZrO_2$ are further preferred. They may be used alone or in combination. Further, surface treatment of particles may be performed by coprecipitation, alternatively, surface treatment may be performed to be covered with alumina in the first place, then the alumina-covered surface may be covered with silica, or vice versa, according to purposes. A surface-covered layer may be porous, if necessary, but a homogeneous and dense surface is generally preferred.

By incorporating carbon blacks into a lower layer, surface electrical resistance (Rs) can be reduced and a desired micro Vickers' hardness can be obtained. The average particle size of carbon blacks is generally from 5 to 80 nm, preferably from 10 to 50 nm, and more preferably from 10 to 40 nm. Specifically, the carbon blacks which can be used in the above-described backing layer can be used in a lower layer. Further, magnetic powders can also be used in the lower layer of the present invention as inorganic powder. As the magnetic powders, gamma-$Fe_2O_3$, Co-modified gamma-$Fe_2O_3$, and alloys comprising alpha-Fe as the main component, and $CrO_2$ are used. The magnetic powder for the lower layer can be selected according to the purpose, and the effect of the present invention does not depend upon the kinds of magnetic powders. However, as is well known, the performances may be varied in the upper layer and the lower layer. For example, to improve long wave recording characteristics, it is preferred to set Hc of the lower magnetic layer at a lower value than Hc of the upper magnetic layer, and it is effective to make Br of the lower magnetic layer higher than Br of the upper magnetic layer. Other than the above means, advantages can be given by using well-known multilayer structures. The binders, lubricants, dispersants, additives, solvents, dispersing methods, and the like described in the above magnetic layer can be used in the lower magnetic layer and the lower nonmagnetic layer. In particular, with respect to the amounts and the kinds of binders, and the amounts and the kinds of additives and dispersants, well-known techniques regarding the magnetic layer can be applied to the lower layer of the present invention.

Flexible supports can be preferably used in the present invention. As the flexible supports, biaxially stretched polyethylene naphthalate (PEN), polyethylene terephthalate (PET), polyamide, polyimide, polyamideimide, aromatic polyamide, and polybenzoxazole are exemplified. These supports may be subjected to surface treatments in advance, e.g., corona discharge treatment, plasma treatment, adhesion assisting treatment and heat treatment. The supports which can be used in the present invention have a central line average surface roughness (at cut-off value of 0.25 mm) of generally from 0.1 to 20 nm, preferably from 1 to 10 nm, and preferably have excellent surface smoothness. It is preferred that these supports not only have a small central line average surface roughness but are free of coarse protrusions of 1 $\mu$m or more. The thickness of the support is from 4 to 15 $\mu$m, and preferably from 4 to 9 $\mu$m. When the thickness of the support is thin, since the concavities and convexities in the backing layer are liable to be impressed due to handling, tension, the setoff can be effectively prevented by using the polyurethane resin as the uppermost layer. When the thickness of the support is 7 $\mu$m or less, PEN or aromatic polyamide such as aramide is preferably used as the support. Aramide is most preferred.

As the flexible supports which can be used in the present invention, biaxially stretched polyethylene naphthalate (PEN), polyethylene terephthalate (PET), polyamide, polyimide, polyamideimide, aromatic polyamide, and polybenzoxazole are exemplified. These supports may be subjected to surface treatments in advance, e.g., corona discharge treatment, plasma treatment, adhesion assisting treatment and heat treatment. The supports which can be used in the present invention have a central line average surface roughness (at cut-off value of 0.25 mm) of generally from 0.1 to 20 nm, preferably from 1 to 10 nm, and preferably have excellent surface smoothness. It is preferred that these supports not only have a small central line average surface roughness but are free of coarse protrusions of 1 $\mu$m or more. The thickness of the support is from 4 to 15 $\mu$m, and preferably from 4 to 9 $\mu$m. When the thickness of the support is thin, since the concavities and convexities in the backing layer are liable to be impressed due to handling tension, the setoff can be effectively prevented by using the polyurethane resin as the uppermost layer. When the thickness of the support is 7 $\mu$m or less, PEN or aromatic polyamide such as aramide is preferably used as the support. Aramide is most preferred.

The magnetic recording medium of the present invention can be manufactured by, e.g., vacuum evaporating or coating a coating solution on the surface of a support under running so that the dry thickness of the layer comes into the prescribed range. A plurality of magnetic coating solutions or nonmagnetic coating solutions can be multilayer-coated sequentially or simultaneously. Air doctor coating, blade coating, rod coating, extrusion coating, air knife coating, squeeze coating, immersion coating, reverse roll coating, transfer roll coating, gravure coating, kiss coating, cast coating, spray coating and spin coating can be used for magnetic layer coating. Regarding these methods, e.g., *Saishin Coating Gijutsu* (*The Latest Coating Techniques*), Sogo Gijutsu Center Co. (May 31, 1983) can be referred to. When a magnetic recording medium having two or more layers on one side of a support is manufactured, e.g., the following methods can be used.

(1) A method of coating a lower layer by any of gravure coating, roll coating, blade coating, and extrusion coating apparatus, which are ordinarily used in the coating of a magnetic coating solution, and then coating an upper layer while the lower layer is still wet by means of the support-pressing type extrusion coating apparatus disclosed, e.g., in JP-B-1-46186 (the term "JP-B" as used herein means an "examined Japanese patent publication"), JP-A-60-238179 and JP-A-2-265672.

(2) A method of coating an upper layer and a lower layer almost simultaneously by using the coating head equipped with two slits for feeding coating solution disclosed in JP-A-63-88080, JP-A-2-17971 and JP-A-2-265672.

(3) A method of coating an upper layer and a lower layer almost simultaneously by using the extrusion coating apparatus equipped with a backup roll disclosed in JP-A-2-174965.

The backing layer can be provided on the side of a support on which a magnetic layer is not coated by coating a backing layer-forming coating solution comprising powder ingredients, e.g., electrically conductive substance-covered inorganic powder and an abrasive, and a binder dispersed in an organic solvent. The coated magnetic layer is dried after the ferromagnetic powder contained in the magnetic layer has been subjected to magnetic field orientation treatment. The magnetic field orientation treatment can be performed arbitrarily by well-known methods. After being dried, the magnetic layer is subjected to surface smoothing treatment by, e.g., super calender rolls. The holes generated by the removal of the solvent by drying vanish by the surface smoothing treatment and the packing rate of the ferromagnetic powder in the magnetic layer is improved. As a result, a magnetic recording medium having high electromagnetic characteristics can be obtained. As the rolls for calendering treatment, heat resisting plastic rolls, e.g., epoxy, polyimide, polyamide and polyamideimide are used. Metal rolls may also be used for the treatment.

It is preferred for the magnetic recording medium of the invention to have smooth surface. For obtaining smooth surface, it is effective to subject the magnetic layer which has been formed by selecting a specific binder as described above to calendering treatment. The calendering treatment is preferably performed at the temperature of the calender rolls of from 60 to 100° C., preferably from 70 to 100° C., and particularly preferably from 80 to 100° C., and the pressure of generally from 100 to 500 kg/cm (from 98 to 490 kA/m), preferably from 200 to 450 kg/cm (from 196 to 441 kA/m), and particularly preferably from 300 to 400 kg/cm (from 294 to 392 kA/cm). The obtained magnetic recording medium can be used by being cut to a desired size with a cutter and the like. The magnetic recording medium having been subjected to calendering treatment is generally heat-treated. In recent years, the reduction of a heat shrinkage factor is regarded as important for the linearity (the security of off-track margin) of a high density magnetic recording medium. In particular, with the trend of narrowing a track, it is required to hold down a heat shrinkage factor in the machine direction under the use atmosphere to 0.07% or less. As the means of reducing a heat shrinkage factor, a method of heat-treating a magnetic recording medium in a web state while handling with low tension, and a method of heat-treating a magnetic recording medium in laminated states such as bulk or the case of encasing a tape in a cassette (thermo-treatment) are known. When the formed method is used, the concavities and convexities in a backing layer are hardly impressed on a magnetic layer, but a heat shrinkage factor cannot be greatly reduced. Although a heat shrinkage factor is somewhat dependent on annealing temperature, residence time, a tape thickness and handling tension, a heat shrinkage factor of 0.1 to 0.12% at 70° C. after 48 hours is the limit. The latter thermo-treatment can widely reduce a heat shrinkage factor, but output reduction and noise increase are caused in some cases by surface roughening of the magnetic layer due to considerable impression of the concavities and convexities in a backing layer onto a magnetic layer.

By adopting the constitution of the magnetic recording medium of the present invention, a highly elastic layer not accompanied by plastic deformation can be formed, therefore, the present invention can provide a magnetic recording medium showing high output and low noise by thermo-treatment. Since the surface of a backing layer can be smoothed, the friction coefficient of the backing layer can be set at a properly great value, by which the friction coefficient between the backing layer and the magnetic layer becomes high, and so the wound form of a magnetic recording medium onto a roll, a slit pancake, or a built-in reel makes a good appearance even when the magnetic recording medium is handled at high speed in manufacturing. Similarly, the wound form of a tape on a reel after rapid traverse of a video cassette recorder or rewinding at high speed makes a good appearance.

EXAMPLES

The present invention will be described in detail below with reference to specific examples, but the present invention should not be construed as being limited thereto. In the examples, "part" means "mass (weight) part" unless otherwise indicated.

The specific examples of the present invention will be described below, but the present invention is not limited thereto.

Examples 1 to 10 and Comparative Examples 1 to 3

Preparation of Coating Solution

Magnetic Layer coating solution

| | |
|---|---|
| Magnetic powder (shown in Table 1) | 100 parts |
| Vinyl chloride copolymer | 5 parts |
| MR110 (manufactured by Nippon Zeon Co., Ltd.) | |
| Polyurethane resin | 3 parts |
| UR 8200 (manufactured by Toyobo Co., Ltd.) | |
| Polyisocyanate | 8 parts |
| α-Alumina | 5 parts |
| HIT55 (manufactured by Sumitomo Chemical Co., Ltd.) | |
| Carbon black | 1 part |
| #50 (manufactured by Asahi Carbon Co., Ltd.) | |
| Phenylphosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

Backing Layer Coating Solution

| | |
|---|---|
| Main powder (shown in Table 1) | 80 parts |
| Carbon black 1 | 5 parts |
| #50 (manufactured by Asahi Carbon Co., Ltd.) | |
| Carbon black 2 | shown in Table 1 |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Polyisocyanate | 8 parts |
| Butyl stearate | 10 parts |
| Butoxyethyl stearate | 5 parts |
| Isohexadecyl stearate | 3 parts |
| Stearic acid | 3 parts |
| Methyl ethyl ketone/cyclohexanone (8/2 mixed solvent) | 250 parts |

The ingredients of each of the coating solutions for a magnetic layer and a backing layer were kneaded in a kneader, and then dispersed with a sand mill. Each of the obtained dispersed solutions was filtered through a filter having an average pore diameter of 1 $\mu$m, thereby a magnetic layer-forming coating solution and a backing layer-forming coating solution were prepared.

The obtained magnetic layer-forming coating solution was coated on a PET support having a thickness of 7 $\mu$m and a central line average surface roughness of 3 nm, and the coated magnetic layer was subjected to orientation in the machine direction by passing through a magnetic field intensity of 300 mT while the layer was still wet. After drying, the magnetic layer was subjected to calendering treatment with calender of 7 stages at 90° C. and linear pressure of 294 kN/m, and then a backing layer-forming coating solution was coated in a thickness of 0.5 $\mu$m. The obtained web was slit to a width of 8 mm. The magnetic layer surface of the thus-produced tape was cleaned with a tape cleaning apparatus equipped with a delivery and a winding-up movement of a slit product to which a non-woven fabric and a razor blade were attached so as to be pressed against the magnetic surface of the tape, thus a tape sample was obtained.

Each performance of the tapes was evaluated according to the following methods.

Methods of Measurement:

(1) Central Plane Average Surface Roughness (Ra)

Central plane average surface roughness (Ra) of the area of about 250 μm×250 μm was measured by TOPO-3D (a product of WYKO Co., U.S.A.). The wavelength of measurement was about 770 nm and spherical compensation and cylindrical compensation were applied, and the measurement was performed with a light interference type non-contact surface roughness meter.

(2) Electromagnetic Characteristics

Measurement was performed by pressing a-magnetic head against the magnetic tape wound onto a rotation drum.

The diameter of the rotation drum was 60 mm, and the relative velocity of head/tape was 10 m/sec.

In recording, an MIG head of saturation magnetization of 1.4 T (gap length: 0.2 μm, track width: 18 μm) was used, and recording current was set at optimal recording current of each tape. An anisotropic type MR head (A-MR) having an elemental thickness of 25 nm was used for reproduction. S/N ratio:

A signal of recording wavelength of 0.2 μm was recorded and the reproduced signal was analyzed by frequency with a spectrum analyzer manufactured by Shibasoku K.K. The ratio of the output of carrier signal (wavelength 0.2 μm) to the integral noise of the full spectral band was taken as the S/N ratio, and the ratio of the output of carrier signal to the noise level of carrier signal ±0.5 MHz was taken as neighborhood C/N ratio.

(3) Friction Coefficient of Back Surface (μ Value)

A μ value with an IEC system 420J-SUS rod at 23° C., 50% RH was obtained by a load of 20 g and a lap angle of 180°.

(4) Rs of Back Surface

Rs of the back surface was obtained by IEC system Rs measurement.

The results obtained are shown in Table 1 below.

TABLE 1

| | Magnetic Layer | | Backing Layer | | | | Results of Evaluation | | | |
| | | | Main Powder | | Carbon Black | | | | | |
| | | | | Surface | 2 | | | | | |
| | Magnetic Powder | | | | Covering by Electrically | Average Particle | Addition | | S/N | Neighborhood C/N | Back Surface |
| Sample No. | Kind | Size (nm) | Kind | Size (nm) | Conductive Substance | Size (nm) | Amount (parts) | Ra (nm) | Ratio (dB) | Ratio (dB) | μ Value | RS (Ω/sq) |
|---|---|---|---|---|---|---|---|---|---|---|---|---|
| Example 1 | BaFe | 30 | Acicular hematite | 150 | Present | 20 | 30 | 3.0 | 5 | 7 | 0.20 | 1.00 E + 5 |
| Example 2 | BaFe | 10 | Acicular hematite | 150 | Present | 20 | 30 | 3.0 | 7 | 9 | 0.25 | 1.00 E + 6 |
| Example 3 | BaFe | 35 | Acicular hematite | 150 | Present | 20 | 30 | 3.0 | 3 | 4 | 0.18 | 1.00 E + 4 |
| Example 4 | MP | 50 | Acicular hematite | 150 | Present | 20 | 30 | 3.0 | 3 | 5 | 0.20 | 1.00 E + 5 |
| Example 5 | MP | 25 | Acicular hematite | 150 | Present | 20 | 30 | 3.0 | 5 | 7 | 0.27 | 1.00 E + 6 |
| Example 6 | MP | 75 | Acicular hematite | 150 | Present | 20 | 30 | 3.0 | 2 | 3 | 0.22 | 1.00 E + 5 |
| Example 7 | MP | 50 | Spherical $TiO_2$ | 35 | Present | 20 | 30 | 3.0 | 2 | 4 | 0.22 | 1.00 E + 5 |
| Example 8 | MP | 50 | Acicular hematite | 150 | Present | 20 | 50 | 3.8 | 2 | 4 | 0.20 | 1.00 E + 4 |
| Example 9 | MP | 50 | Acicular hematite | 150 | Present | 20 | 0 | 2.9 | 4 | 6 | 0.25 | 5.00 E + 6 |
| Example 10 | MP | 50 | Acicular hematite | 150 | Present | 20 | 30 | 2.5 | 2.5 | 4.5 | 0.20 | 5.00 E + 5 |
| Comparative Example 1 | BaFe | 30 | Acicular hematite | 150 | Absent | 20 | 30 | 2.5 | 5 | 7 | 0.30 | 1.00 E + 10 |
| Comparative Example 2 | MP | 50 | Acicular hematite | 150 | Absent | 20 | 30 | 2.5 | 3 | 5 | 0.30 | 1.00 E + 10 |
| Comparative Example 3 | MP | 50 | Acicular hematite | 150 | Absent | 20 | 100 | 6.5 | −1 | −1 | 0.20 | 1.00 E + 5 |

In Table 1, in the column of Magnetic Powder, "BaFe" means barium ferrite, "MP" means ferromagnetic metal powder [(composition: Fe 70 atomic %, Co 30 atomic %, Al/Fe 8 atomic %, Y/Fe 6 atomic %), long axis length: 60 nm, crystallite size: 14 nm, specific surface area: 70 $m^2/g$, Hc: 2,300 Oe (184 kA/m), and saturation magnetization as: 120 $A \cdot m^2/kg$], and "Size" of BaFe means an average tabular size and that of MP means an average long axis length. In the column of Main Powder in Backing Layer, in the case of the main powder being acicular, "Size" means an average long axis length, and in the case of the main powder being spherical (Example 7), "Size" means an average particle size, and in the column of Surface Covering by Electrically Conductive Substance, "Present" means that inorganic powders before being covered with electrically conductive substance were covered with 5 mass % of carbon, and the sizes of these main powders do not include covered carbon. In the column of Rs in Back Surface, e.g., "1.00E+5" means $1.00 \times 10^{+5}$ (the others are also the same).

From the results shown in Table 1, it can be seen that the samples in Examples of the invention are low in back surface Rs and effective for running durability as compared with the samples in Comparative Examples.

Since the setoff of a backing layer to a magnetic layer can be inhibited and surface electrical resistance can be reduced by using electrically conductive substance-covered inorganic powder in the backing layer, the present invention can provide a magnetic recording medium excellent in electromagnetic characteristics and running durability.

This application is based on Japanese Patent application JP 2002-159619, filed May 31, 2002, the entire content of which is hereby incorporated by reference, the same as if set forth at length.

What is claimed is:

1. A magnetic recording medium comprising a magnetic layer, a support and a backing layer in this order, wherein the backing layer has a central plane average surface roughness Ra of from 2 to 4 nm and comprises a binder and an inorganic powder having a surface covered with an electrically conductive substance.

2. The magnetic recording medium according to claim 1, wherein a central plane average surface roughness Ra of the backing layer is from 2.5 to 3.5 nm.

3. The magnetic recording medium according to claim 2, wherein the inorganic powder is an acicular oxide.

4. The magnetic recording medium according to claim 1, wherein the backing layer comprises 50 weight % or more of the inorganic powder whose surfaces are covered with an electrically conductive substance based on inorganic powders in the backing layer, and the backing layer comprises 50 weight % or less of carbon black based on the weight % of the inorganic powder.

5. The magnetic recording medium according to claim 4, wherein the inorganic powder is an acicular oxide.

6. The magnetic recording medium according to claim 1, wherein the backing layer comprises 50 weight % or more of the inorganic powder whose surfaces are covered with an electrically conductive substance based on inorganic powders in the backing layer, and the backing layer comprises 20 to 40 weight % of carbon black based on the weight % of the inorganic powder.

7. The magnetic recording medium according to claim 1, wherein the inorganic powder is an acicular oxide.

8. The magnetic recording medium according to claim 1, wherein the electrically conductive substance is a carbon, a metal, or a semiconductor.

9. The magnetic recording medium according to claim 1, wherein an amount of the electrically conductive substance is from 0.1 to 10 weight % of the inorganic powder.

10. The magnetic recording medium according to claim 1, wherein the backing layer has a glass transition temperature of from 60 to 120° C.

11. A magnetic recording medium according to claim 1, wherein the thickness of the magnetic layer is from 0.01 to 1 μm.

12. A magnetic recording medium according to claim 1, wherein the thickness of the magnetic layer is from 0.03 to 0.5 μm.

13. A magnetic recording medium according to claim 1, wherein the magnetic layer comprises an acicular alloy powder having an average long axis length of from 30 to 100 nm.

14. A magnetic recording medium according to claim 1, wherein the magnetic layer comprises an acicular alloy powder having an average long axis length of from 40 to 80 nm.

15. A magnetic recording medium according to claim 1, wherein the magnetic layer comprises a hexagonal ferrite powder having an average tabular diameter of from 10 to 50 nm.

16. A magnetic recording medium according to claim 1, wherein the magnetic layer comprises a hexagonal ferrite powder having an average tabular diameter of from 10 to 40 nm.

17. A magnetic recording medium according to claim 1, wherein the magnetic layer comprises a hexagonal ferrite powder having an average tabular diameter of from 10 to 35 nm.

18. A magnetic recording medium comprising a magnetic layer, a support and a backing layer in this order, wherein the backing layer comprises a binder and an inorganic powder, which is an acicular oxide, having a surface covered with an electrically conductive substance.

19. A magnetic recording medium according to claim 18, wherein the thickness of the magnetic layer is from 0.01 to 1 μm.

20. A magnetic recording medium according to claim 18, wherein the thickness of the magnetic layer is from 0.03 to 0.5 μm.

21. A magnetic recording medium according to claim 18, wherein the magnetic layer comprises an acicular alloy powder having an average long axis length of from 30 to 100 nm.

22. A magnetic recording medium according to claim 18, wherein the magnetic layer comprises an acicular alloy powder having an average long axis length of from 40 to 80 nm.

23. A magnetic recording medium according to claim 18, wherein the magnetic layer comprises a hexagonal ferrite powder having an average tabular diameter of from 10 to 50 nm.

24. A magnetic recording medium according to claim 18, wherein the magnetic layer comprises a hexagonal ferrite powder having an average tabular diameter of from 10 to 40 nm.

25. A magnetic recording medium according to claim 18, wherein the magnetic layer comprises a hexagonal ferrite powder having an average tabular diameter of from 10 to 35 nm.

* * * * *